July 1, 1941.     C. E. HARTFORD ET AL     2,247,373
MAKING PHOSPHORIC ACID
Filed Jan. 24, 1939
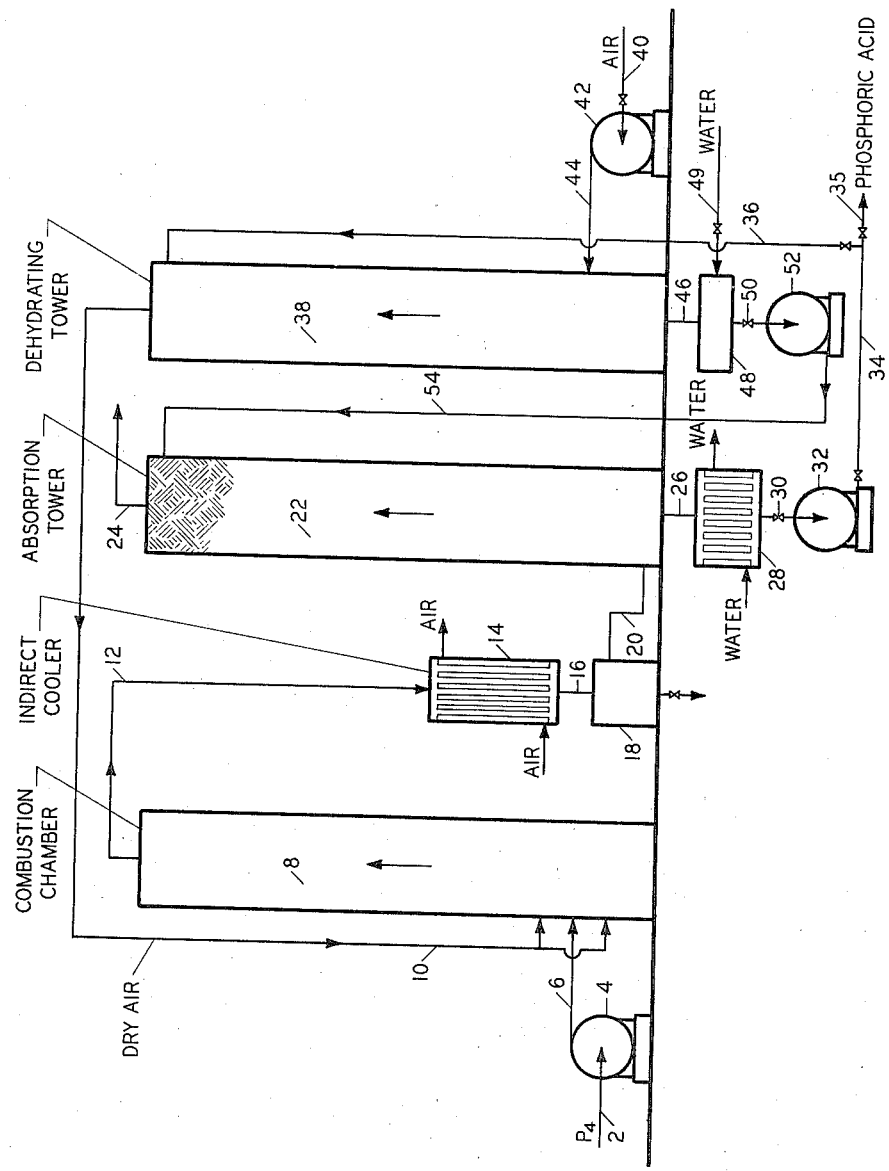
Charles E. Hartford
Marcus M. Striplin Jr.
INVENTORS
BY Arthur L. Davis
ATTORNEY Patented July 1, 1941

2,247,373

UNITED STATES PATENT OFFICE 2,247,373

MAKING PHOSPHORIC ACID

Charles E. Hartford, St. Andrews, Fla., and Marcus M. Striplin, Jr., Florence, Ala.

Application January 24, 1939, Serial No. 252,540

4 Claims. (Cl. 23—165)

(Granted under the act of March 3, 1883, as amended April 30, 1928; 370 O. G. 757)

The invention herein described may be manufactured and used by or for the Government for governmental purposes without the payment to us of any royalty thereon.

This invention relates to the art of making phosphoric acids having a phosphorus pentoxide higher than that of orthophosphoric acid.

The principal object of this invention is to provide a process whereby phosphorus pentoxide may be readily recovered from a gaseous mixture containing the same. Another object of this invention is to produce phosphoric acid having a high phosphorus pentoxide content directly from phosphorus pentoxide contained in a gaseous mixture without the preliminary separation of the phosphorus pentoxide from such a mixture. Other objects of this invention include the provision of a method for the production of phosphoric acids by the direct absorption of phosphorus pentoxide vapor instead of the collection of a fog of liquid particles consisting of phosphorus pentoxide in varying degrees of hydration.

It has been proposed to produce phosphoric acid by absorbing phosphorus pentoxide in an aqueous solution of orthophosphoric acid, by completely hydrating the phosphorus pentoxide and collecting the hydrate in an aqueous solution of orthophosphoric acid, and by controlling the extent of hydration of the phosphorus pentoxide and by separating the product mechanically or electrostatically.

We have discovered a process for making phosphoric acid which has a phosphorus pentoxide content higher than orthophosphoric acid by producing a gaseous mixture containing phosphorus pentoxide vapor and substantially free from any hydrated phosphorus pentoxide, and by absorbing the phosphorus pentoxide vapor from said mixture in phosphoric acid having a phosphorus pentoxide content greater than orthophosphoric acid and slightly less than the phosphoric acid being made.

In the accompanying drawing which forms a part of the specification, liquid elemental phosphorus is admitted through line 2 into the intake of pump 4 from which it is discharged through line 6 into combustion chamber 8 where it is burned with dried air admitted through line 10. The products of combustion from combustion chamber 8 pass through line 12 to an indirect cooler 14 and are discharged through line 16 into separator 18 where entrained material, such as finely divided solid impurities, which are originally present in the elemental phosphorus or mixtures containing the same, is separated. The gaseous mixture from separator 18 passes through line 20 into the bottom of a phosphorus pentoxide absorption tower 22 and the residual gas is withdrawn through line 24. The hot phosphoric acid produced in tower 22 passes through line 26 into the indirectly cooled receiver 28 from which it is withdrawn through valved line 30 into pump 32 which discharges the phosphoric acid into a valved line 34. A substantial portion of the phosphoric acid produced is withdrawn through valved line 35 while that portion of the product which is required for the dehydration of the air used for the combustion of the phosphorus is delivered through valved line 36 to the top of the dehydrating tower 38. Air to be dehydrated is admitted through valved line 40 into pump 42 which delivers it through line 44 into the bottom of dehydrating tower 38 from the top of which the dehydrated air is discharged through line 10. The phosphoric acid passing downwardly through tower 38 becomes somewhat diluted and such diluted acid passes from the bottom of the tower through line 46 into receiver 48. Whenever the phosphoric acid in receiver 48 is not substantially dilute for the proper operation in tower 22 the required amount of water is added through valved line 49. The diluted phosphoric acid in receiver 48 is discharged through valved line 50 into pump 52 which discharges this phosphoric acid through line 54 into the top of phosphorus pentoxide adsorption tower 22.

It is evident that there are numerous factors which will influence conditions for the most satisfactory operation of our invention the actual limits of which cannot be established except by a detailed study of each set of raw materials and the intermediate and finished products involved.

The oxidation of elemental phosphorus in phosphate reduction furnace gas or separated elemental phosphorus is usually considered to produce phosphorus pentoxide regardless of whether or not a substantial excess of air carrying its usual water content is used. Phosphorus pentoxide vapor is undoubtedly initially produced but such vapor is partially or completely hydrated to a phosphoric acid fog or mist with the extent of the production of such fog or mist depending upon the amount of water available from the air initially used for oxidation or produced from associated material during the oxidation process. The phosphoric acid fog may be separated effectively in an electrostatic separator, or separated with moderate effectiveness in various types of mechanical separators. However, there are numerous proposals in the art calling for the "absorption" of such a phosphoric acid fog or mist in aqueous solutions, particularly aqueous solutions of orthophosphoric acid. The term absorption may be correctly applied to "the apparent disappearance of one or more substances * * * by being taken into another substance," as is the case when a true gas is absorbed in a liquid, and not when a substance in liquid form and dispersed in a gas as a fog is separated by contact with another liquid. Furthermore, the technique for the true absorption of a gaseous substance is distinctly different from the technique for the separation of a liquid substance dispersed in the form of a fog or mist, both of which are well known.

In the present process, the phosphorus pentoxide produced by the oxidation of elemental phosphorus is kept in the vapor state and not permitted to be converted to a hydrate in the form of a fog or mist, by keeping such vapor in a substantially anhydrous atmosphere until it is actually absorbed in a suitable absorbent. This is accomplished by using dry air for the oxidation of the elemental phosphorus and by maintaining the phosphorus pentoxide content of the absorbent and the temperature of such absorbent so that substantially no partial pressure of water vapor over the absorbent exists at any stage in the absorption step proper.

The elemental phosphorus is oxidized with substantially dehydrated air. The amount of excess air is maintained at the minimum satisfactory for complete oxidation of phosphorus in order that a minimum amount of air may have to be dehydrated. A 45 to 70% excess of air has been used satisfactorily for this purpose. The air used for the oxidation of the elemental phosphorus may be dehydrated by any suitable means but in this case it is more economical to use a portion of the product being formed for this purpose since a phosphoric acid containing 72.4% or more $P_2O_5$ is an excellent desiccating agent. By this means air containing as low as 0.0006 pound of water per pound of air has been produced for this purpose.

The oxidation products carrying phosphorus pentoxide vapor may be cooled to any suitable temperature so long as that temperature is above the "dew point" or condensation point for the phosphorus pentoxide vapor. Calculations indicate that the temperature at which the phosphorus pentoxide vapor may be condensed to a solid from oxidation products resulting from the use of an elemental phosphorus and 50% excess air is approximately 260° C. Satisfactory results have been obtained for the operation of this process wherein the oxidation products have been cooled so that the temperature of the gas entering the absorption tower is between 350 and 530° C. It is likewise necessary, during the absorption of the phosphorus pentoxide vapor from the gaseous mixture, that the temperature of the mixture shall at no time be lower than the temperature which corresponds to the "dew point" or condensation point for the phosphorus pentoxide contained in the gas at that specific location. Calculations indicate that the condensation temperature is approximately 191° C. after recovery of 95% of the phosphorus pentoxide from oxidation products obtained when using elemental phosphorus and 50% excess air. Therefore, the exit of the absorption tower has been maintained at approximately 200° C. with satisfactory operation resulting therefrom.

In obtaining true absorption of the phosphorus pentoxide vapor low gas velocity values through the absorption tower may be used in contra-distinction to substantially higher gas velocity values required in securing moderately efficient mechanical separation of fog or mist. Gas velocity values through the absorption tower of 1.4 to 2.8 feet per second have been found to be satisfactory in carrying out this process.

The phosphoric acid absorbent used should contain more than 72.4% by weight of phosphorus pentoxide since orthophosphoric acid, or aqueous solutions of orthophosphoric acid, are unsuitable for this purpose. The phosphoric acid used should preferably contain more than 80% by weight of phosphorus pentoxide. Particularly satisfactory results have been obtained using phosphoric acid containing 83 to 86% by weight of phosphorus pentoxide. The flow of acid through the absorption tower should be sufficiently high to afford thorough wetting of the packing. Satisfactory results have been obtained using rates of 625 to 2890 pounds of acid absorbent per hour per square foot of transverse tower area. The temperature of the acid absorbent entering the absorption tower should be above the dew point of the gas leaving the absorption tower in order not to condense residual phosphorus pentoxide from the gas. Acid introduced into the tower at a temperature of about 200° C. has been found to be satisfactory for this purpose when used in connection with the absorption of phosphorus pentoxide from a gas obtained by the oxidation of elemental phosphorus with a 50% excess of air. Likewise, the temperature of the acid leaving the absorption tower should be sufficiently high to prevent the condensation of phosphorus pentoxide from the entering gas. Satisfactory results have been obtained with a temperature of 200 to 275° C. with the entering gas temperatures as given above. It has been found that when the temperature of the acid absorbent is so maintained that phosphorus pentoxide vapor condenses to a solid, this solid phosphorus pentoxide remains suspended in the absorbent and does not apparently dissolve or at least not within a reasonable period of time.

The term "orthophosphoric acid" as used in the description and claims means orthophosphoric acid containing 100% by weight of $H_3PO_4$.

It will be seen, therefore, that this invention actually may be carried out by the use of various modifications and changes without departing from its spirit and scope, with only such limitations placed thereon as are imposed by the prior art.

We claim:

1. A process of making a phosphoric acid which has a phosphorus pentoxide content higher than orthophosphoric acid which comprises producing a gaseous mixture containing phosphorus pentoxide vapor substantially free from any hydrated phosphorus pentoxide, and absorbing the phosphorus pentoxide vapor from said mixture in phosphoric acid having a phosphorus pentoxide content greater than orthophosphoric acid and less than the phosphoric acid being made while maintaining said gaseous mixture and said phosphoric acid absorbent respectively at temperatures above the condensation point for phosphorus pentoxide vapor in said mixture.

2. The process of making a phosphoric acid according to claim 1 wherein the phosphoric acid absorbent contains not less than 80% phosphorus pentoxide.

3. A process of making a phosphoric acid which has a phosphorus pentoxide content higher than orthophosphoric acid which comprises absorbing phosphorus pentoxide vapor substantially free from hydrated phosphorus pentoxide in phosphoric acid having a phosphorus pentoxide content greater than orthophosphoric acid and less than the phosphoric acid being made while maintaining said phosphorus pentoxide and said phosphoric acid absorbent respectively at temperatures above the condensation point for the phosphorus pentoxide vapor.

4. A process of making a phosphoric acid which has a phosphorus pentoxide content higher than orthophosphoric acid which comprises absorbing phosphorus pentoxide vapor substantially free from hydrated phosphorus pentoxide in phosphoric acid containing not less than 80% phosphorus pentoxide while maintaining said phosphorus pentoxide and said phosphoric acid absorbent respectively at temperatures above the condensation point for the phosphorus pentoxide vapor.

CHARLES E. HARTFORD.
MARCUS M. STRIPLIN, Jr.